United States Patent
Jansen (10) Patent No.: US 11,446,886 B2
(45) Date of Patent: Sep. 20, 2022

(54) METHOD AND DEVICE FOR PRODUCING A PLASTIC PROFILE

(71) Applicant: Thomas GmbH + Co. Technik + Innovation KG, Bremervörde (DE)

(72) Inventor: Klaus Jansen, Buxtehude (DE)

(73) Assignee: Thomas GmbH + Co. Technik + Innovation KG, Bremervörde (DE)

( * ) Notice: Subject to any disclaimer, the term of this patent is extended or adjusted under 35 U.S.C. 154(b) by 323 days.

(21) Appl. No.: 16/615,643

(22) PCT Filed: May 3, 2018

(86) PCT No.: PCT/EP2018/000238
§ 371 (c)(1),
(2) Date: Nov. 21, 2019

(87) PCT Pub. No.: WO2018/215087
PCT Pub. Date: Nov. 29, 2018

(65) Prior Publication Data
US 2020/0180242 A1    Jun. 11, 2020

(30) Foreign Application Priority Data
May 24, 2017    (DE) .......................... 102017005296.4

(51) Int. Cl.
*B29B 15/12*    (2006.01)
*B29C 70/52*    (2006.01)
(Continued)

(52) U.S. Cl.
CPC .......... *B29C 70/526* (2013.01); *B29C 70/521* (2013.01); *B29B 15/122* (2013.01); *B29C 70/527* (2013.01); *B29K 2105/06* (2013.01); *B29K 2307/04* (2013.01); *B32B 2260/046* (2013.01)

(58) Field of Classification Search
CPC ..... B29B 15/122; B29C 48/131; B29C 70/16; B29C 70/20; B29C 70/50; B29C 70/52;
(Continued)

(56) References Cited

U.S. PATENT DOCUMENTS 8,066,922 B2    11/2011    Jansen et al.
2009/0206515 A1    8/2009    Jansen et al.
(Continued)

FOREIGN PATENT DOCUMENTS

CN    101641205 A    2/2010
CN    103476573 A    12/2013
(Continued)

OTHER PUBLICATIONS

WIPO, International Search Report (on priority application), dated Aug. 7, 2018.
(Continued)

*Primary Examiner* — Michael A Tolin
(74) *Attorney, Agent, or Firm* — Laurence P. Colton; Smith Tempel Blaha LLC (57) ABSTRACT

Plastic profiles are produced by a pultrusion method. For this, a mold is moved periodically relative to the stationary plastic profile and said profile is held by a holding means and transported away. In particular, the starting and the stopping of the method are problematical, since a tensile stress must be applied, by which both "slack" fibers and "rigid" profiles can be drawn through the mold. The invention creates a method and a device for simple and reliable manufacture of plastic profiles. For this, it is provided that at least one cross section of a receiving space of the at least one holding means is changed along a longitudinal axis of the holding means in order to grasp a reinforcement and/or the plastic profile.

13 Claims, 6 Drawing Sheets

(51) Int. Cl.
B29K 105/06 (2006.01)
B29K 307/04 (2006.01)

(58) Field of Classification Search
CPC ... B29C 70/521; B29C 70/523; B29C 70/525; B29C 70/526; B29C 70/527; B29C 70/541; B29C 70/56; B29K 2105/06; B29K 2307/04; B29L 2031/003; B32B 2260/046

See application file for complete search history.

(56) References Cited

U.S. PATENT DOCUMENTS

2014/0117581 A1* 5/2014 Jansen .................. B29C 70/528
425/375

2015/0129116 A1* 5/2015 Richeton ................ B60R 19/03
293/120
2016/0167609 A1* 6/2016 Corwin ................ B29C 70/525
264/149

FOREIGN PATENT DOCUMENTS

DE 102008013467 A1 11/2008
WO 2017080638 A1 5/2017

OTHER PUBLICATIONS

Intellectual Property Office India, Examination Report (in a related application), dated Jun. 9, 2021.
China National Intellectual Property Administration, Notification of First Office Action (in a related application), dated May 8, 2021.

* cited by examiner

METHOD AND DEVICE FOR PRODUCING A PLASTIC PROFILE

CROSS REFERENCE TO RELATED APPLICATIONS

This application is the US National Phase of and claims the benefit of and priority on International Application No. PCT/EP2018/000238 having an international filing date of 3 May 2018, which claims priority on and the benefit of German Patent Application No. 10 2017 005 296.4 having a filing date of 24 May 2017.

BACKGROUND OF THE INVENTION

Technical Field

The invention relates to a method for producing a preferably curved plastic profile, wherein a continuous reinforcement made of strands, textiles and/or the like is pulled by at least one holding means through a mold, for which the reinforcement and/or the plastic profile is grasped at least temporarily by the at least one holding means, and the reinforcement is embedded in a matrix in the mold and wherein the mold and the at least one holding means on the plastic profile are moved periodically relative to each other. Furthermore, the invention relates to a device for producing a preferably curved plastic profile having a mold, in which a continuous reinforcement can be embedded in a matrix, and at least one holding means, with which the plastic profile can be led through the mold, wherein the mold and the at least one holding means on the plastic profile are moved periodically relative to each other.

Prior Art

As is known, straight plastic profiles in particular are made of plastic and a continuous reinforcement made of fibers, textiles, or the like, which are embedded in the plastic, and produced as a continuous strand. This method usually involves a pultrusion process. In such a pultrusion process, the at least one fiber strand is pulled through a mold. This fiber strand is provided with the liquid plastic, or matrix, either before or in the mold during its passage through, and it is then cured in the mold. The cured plastic profile leaving the mold is then pulled through the mold by a stripping device or holding means situated before the mold in the production direction and at the same time it is transported away. Because the plastic profile is pulled by the holding means through the mold, only straight plastic profiles can be made with conventional methods of the described kind, especially with known pultrusion methods.

For the production of curved plastic profiles it is known that the mold must be moved in addition to this. This method is known as radius pultrusion. In this method, the mold is periodically moved at first relative to the stationary plastic profile and the latter is then transported away in an opposite movement through the opened holding means.

Not only in radius pultrusion, but also in "standard" pultrusion, the starting and stopping of the process in particular is problematical. Whereas only "rigid" profiles need to be pulled and deflected during the ongoing production process, "slack" fibers are also situated before and after the profile during the starting and stopping of the process and they also need to be effectively grasped by the holding means for transporting, which is problematical in the current methods.

In known pultrusion devices, this is normally handled in that the fibers are, e.g., manually twisted and optionally fixed in addition by adhesive tape, and the resulting strands or bundles are pulled through the mold or holding means or stripping device. The fiber segments situated in the holding means or in the stripping device are meanwhile manually retensioned at the end of the device. This retensioning of the loose fibers or reinforcement is continued by manual interventions until such time as the cured profile can be held by the at least one holding means and pulled through the mold.

However, this method requires much skill and special dexterity of the attendant. Furthermore, this method involves substantial safety risks, since one must work constantly in the zone of the running machine, especially in proximity to the opening and closing holding means. It is especially difficult and risky when several strands are being operated in parallel on one machine and are placed in operation sequentially, for example.

BRIEF SUMMARY OF THE INVENTION

Therefore, the problem which the invention proposes to solve is to create a method and a device for the simple and safe production of preferably curved plastic profiles.

A method for the solving of this problem involves a method for producing a preferably curved plastic profile, wherein a continuous reinforcement made of strands, textiles and/or the like is pulled by at least one holding means through a mold, for which the reinforcement and/or the plastic profile is grasped at least temporarily by the at least one holding means, and the reinforcement is embedded in a matrix in the mold and wherein the mold and the at least one holding means on the plastic profile are moved periodically relative to each other, characterized in that at least one cross section of a receiving space of the at least one holding means is changed along a longitudinal axis of the holding means in order to grasp the reinforcement and/or the plastic profile.

According to this, it is provided that at least one cross section of a receiving space of the at least one holding means is changed along a longitudinal axis of the holding means in order to grasp the reinforcement and/or the plastic profile. As a result of the change in the at least one cross section of the receiving space of the holding means, both the reinforcement and the at least partly finished plastic profile can be grasped by the holding means and be transported away or pulled in the production direction in a simple and safe manner. An additional intervention by an attendant person is no longer needed in this method according to the invention. In this way, an especially simple and safe method is created for the production of a preferably curved plastic profile.

In particular, it may furthermore be provided according to the invention that, for the grasping of the reinforcement and/or the plastic profile, cross sections of the receiving space are changed along a longitudinal axis of the at least one holding means at several positions, wherein the reinforcement to be grasped is deflected by the cross section changes of the receiving space from a straight trend preferably to a meandering trend. In the current pultrusion methods, the receiving space of the holding means is dimensioned such that, when the plastic profile is grasped, the space corresponds in its cross section directly to the cross section of the plastic profile, so that the profile can be firmly grasped by the holding means. As a result of the changeability of the cross section of the receiving space according to the present invention, not only the finished plastic profiles but also the slack reinforcement can be grasped and pulled in the production direction. For this, the cross sections are changed along the longitudinal axis of the at least one holding means in such a way that the slack reinforcement is deflected or forced from its taut straight course into a curved or meandering course. As a result of this deflection of the reinforcement, the friction between the holding means and the reinforcement is increased in such a way that a sufficient tensioning force can be exerted by the holding means on the reinforcement so that the reinforcement can be pulled through the mold by means of the at least one holding means. This overcomes the aforementioned drawback of the manual, very costly pulling forward of the reinforcement.

Preferably, moreover, it may be provided that, for the simultaneous firm grasping by the at least one holding means of both the reinforcement and a section of the plastic profile which was formed from the reinforcement and which is directly adjacent to the reinforcement, cross sections of the receiving space are changed at several positions along the longitudinal axis of the holding means for sections and corresponding to the mold of the plastic profile and the reinforcement. Thus, especially during the starting and stopping of the manufacturing process, it is possible to pull away the reinforcement from which a plastic profile has just been formed as well as a plastic profile whose resin feed has been halted and thus transitions into loose reinforcement. Especially in situations where both a plastic profile and loose reinforcements are present in the holding means, the changing of the cross sections of the receiving space for a portion can produce a bond which is firm enough to pull the plastic profile or the reinforcement through the mold. The change in the cross sections along the longitudinal axis of the holding means is preferably done automatically. That is, the cross sections of the receiving space are at first the maximum size, and then when the reinforcement or the plastic profile is grasped they "move together" until the cross sections are dimensioned such over the entire length of the holding means that a sufficiently large force locking has been produced both with the reinforcement and with the plastic profile to pull the plastic profile or the reinforcement through the mold.

A further exemplary embodiment of the present invention may provide that, for the grasping of the plastic profile and/or of the reinforcement by the at least one holding means, the cross sections of the receiving space are changed in succession, especially sequentially, along the longitudinal axis of the at least one holding means. As a result of the deflecting of the reinforcement from a previously straight course due to the change of the cross section of the at least one holding means, the segment of the reinforcement in the holding means is lengthened. So that this brief lengthening of the reinforcement does not result in damage or even ripping of the reinforcement, the cross section change of the receiving space occurs along the longitudinal axis sequentially, i.e., the cross sections change in succession along the longitudinal axis. In this way, one may control how large the mechanical tension on the reinforcement is before or after the holding means and possibly adopt countermeasures when the mechanical tension becomes too large. For the measuring of the mechanical tension, it may be provided that corresponding sensors are associated with the holding means or that the force acting on the holding means is measured. In the event that two or more holding means are used for the method of the invention, the cross section change will also occur there in succession or in sequence.

As another advantageous exemplary embodiment it has been discovered that holding means jaws of each holding means part of the at least one holding means are moved perpendicular to a longitudinal axis of the reinforcement and/or the plastic profile, especially independently of each other. Each holding means consists of at least two holding means parts or holding means halves, which are moved together to grasp the reinforcement or the plastic profile and moved apart to release the profile and/or the reinforcement. These holding means parts or halves are associated with movable holding means jaws. These holding means jaws can be operated automatically or also alternatively controlled manually. As a result of the individual or independent actuating and moving of these holding means jaws, almost any given reinforcement and/or plastic profile can be grasped firmly enough.

Preferably, moreover, it may be provided that, according to the invention, the reinforcement is clamped by a stripping device, especially a stripping roller or a stripping winch or another holding means, situated after the at least one holding means looking in a production direction, between the mold and the stripping device, and during the grasping of the reinforcement by the at least one holding means the reinforcement is at least partly released once more from the stripping device, preferably the clamping force is decreased. Especially during the process step in which the holding means releases the reinforcement at least temporarily in order to move in the direction of the mold, the mechanical tension of the reinforcement by the stripping device, to which the reinforcement is attached by one free end, is maintained. During the renewed grabbing or grasping of the reinforcement by the holding means, a portion of the reinforcement already pulled away by the stripping device is again released under a predetermined mechanical tension. The stripping device serves merely to maintain the mechanical tension of the reinforcement, but it may also serve for pulling the reinforcement through the mold. As soon as the loose reinforcement transitions into the rigid plastic profile, the reinforcement is severed from the plastic profile by a saw, for example, which may be associated with the stripping device, so that the finished plastic profile can be transported away in the usual manner through the holding means and moved along in the production direction.

In particular, it may be further provided that the reinforcement is clamped by the stripping device while the at least one holding means loses contact with the reinforcement and is moved along the reinforcement in order to grasp the reinforcement once again, or when the reinforcement is pulled through the mold in alternation of several holding means the reinforcement is clamped by the stripping device.

A further especially preferred exemplary embodiment of the present invention may provide that the reinforcement is twisted by rotation of the stripping device about the longitudinal axis of the at least one holding means. By the twisting of the reinforcement, it undergoes a further securing against unintentional slippage during the pulling phase. For the twisting, it may be provided that the stripping device rotates the reinforcement or that the entire stripping device is rotated about the longitudinal axis of the reinforcement. Furthermore, it may also be provided that a twisting unit is used before the stripping device in the production direction in order to twist together the strands of the reinforcement.

Finally, a preferred exemplary embodiment of the present invention provides that the mold is moved on the plastic profile along its course, in particular the plastic profile is held fast during the movement of the mold and the mold is moved back and forth discontinuously or stepwise, wherein a relative movement of the mold to the plastic profile occurs preferably only during a backward movement of the mold against the production direction and the at least one holding means is brought out of contact with the plastic profile in phases during which the mold is standing still and it is moved relative to the stationary plastic profile in the direction of the likewise stationary mold, preferably is moved back against the production direction, and optionally after the backward movement of the mold at least one holding means having lost contact with the plastic profile is moved into the vicinity of the front end of the mold, preferably relative to the stationary plastic profile.

A device for the solving of the aforementioned problem a device for producing a preferably curved plastic profile having a mold, in which a continuous reinforcement can be embedded in a matrix, and at least one holding means, with which the plastic profile can be led through the mold, wherein the mold and the at least one holding means on the plastic profile are moved periodically relative to each other, characterized in that at least one cross section of a receiving space of the at least one holding means is changeable along a longitudinal axis of the holding means in order to grasp the reinforcement and/or the plastic profile.

Accordingly, it is provided that at least one cross section of a receiving space of the at least one holding means is changeable along a longitudinal axis of the holding means in order to grasp the reinforcement and/or the plastic profile. As a result of the changing of the cross section of the receiving space, both the reinforcement and also the plastic profile can be grasped, preferably at the same time, in order to transport it in the production direction or pull it through the mold. This proves to be particularly easy and safe for the attendant person, especially for the transporting away of the slack reinforcement, because the person does not need to reach into the device while it is operating.

In particular, it may be provided that the holding means is composed of at least two, preferably four holding means parts which are movable relative to each other, especially perpendicular to the production direction of the plastic profile, and each holding means part comprises at least one holding means jaw, preferably a plurality of holding means jaws, wherein the holding means jaws are movable perpendicular to the production direction of the plastic profile. The holding means parts of the holding means or the holding means halves can be joined together such that the receiving space is formed between them to receive the reinforcement or the plastic profile. By the moving apart of these holding means parts, the receiving space is freed up to receive the reinforcement or the plastic profile. On an inner wall of this receiving space, the holding means jaws are movably mounted in such a way that they can move perpendicular to the longitudinal axis of the reinforcement or the plastic profile in order to grasp them firmly. In the event that the holding means is composed of four holding means parts, holding means jaws can act on and accordingly secure the reinforcement or the plastic profile from four different directions, namely, from four different holding means parts.

Furthermore, it may be further preferably provided that the holding means jaws are movable individually and independently of each other, especially automatically, and at least some of the holding means jaws of different holding means parts are situated facing each other and are movable complementary to each other in the direction of the longitudinal axis and preferably in such a way that at least one holding means jaw is movable beyond the longitudinal axis in the direction of the oppositely facing holding means part. For example, all holding means jaws can be operated individually by actuators and changed in their relative position to each other. Likewise, it is conceivable that the holding means jaws are inflatable cushions or bags, or a liquid or gas operated cylinder. When the holding means parts move together, the holding means jaws are moved, preferably automatically, in such a way in the direction of the longitudinal axis of the plastic profile or also beyond it until such time as a predetermined opposing force is achieved or a predetermined position is reached.

Furthermore, it is also conceivable for a stripping device, especially a stripping roller or a stripping winch or a further holding means, to be positioned after the at least one holding means, looking in the production direction of the plastic profile, with which the reinforcement can be grasped and clamped, while the reinforcement can be released again at least temporarily by the stripping device, preferably during the production process, in particular the mechanical tension of the reinforcement can be varied by the stripping device. The stripping device comprises in particular a gripper with which a loose end of the reinforcement can be grasped, in order to pull it in the production direction or build up a mechanical tension. For the moving together of the holding means parts, the reinforcement can be at least partly released once more from the stripping device, in order to prevent a tearing of the reinforcement.

Further, it may be provided that the stripping device is mounted so that it can rotate about the reinforcement, so that the individual strands of the reinforcement can be twisted together, or a twisting unit is arranged after the stripping device, which twists together the individual strands of the reinforcement. As a result of this twisting, the reinforcement is further protected against the individual strands slipping relative to each other.

BRIEF DESCRIPTION OF THE DRAWINGS

A preferred exemplary embodiment of the present invention is explained more closely in the following with the aid of the drawing. There are shown.

DETAILED DESCRIPTION OF PREFERRED EMBODIMENTS

FIGS. 1 to 5 show, highly schematized, a device according to the invention, which also serves for carrying out the method according to the invention. This device is a pultrusion device for a plastic profile 20 with an interior reinforcement 21, made of strands 23, textiles and/or the like and surrounded by a plastic 22, acting as a matrix, which may preferably be a thermosetting plastic. In the merely schematically shown exemplary embodiment, it is assumed that the reinforcement 21 consists of a plurality of endless strands 23 made preferably from high tensile strength fibers, such as carbon fibers. But any other desired reinforcements may be embedded in the plastic 22, such as woven and/or knitted fabric or combinations of the strands 23 with woven and/or knitted fabric.

With the schematically illustrated device and the method according to the invention, plastic profiles 20 with any desired trend may be produced by pultrusion. The figures show for example a curved plastic profile 20, which is given a curved trend. But it is also conceivable to use the device according to the invention and the method according to the invention to produce plastic profiles 20 having a spatial (three-dimensional) trend.

The device illustrated in FIGS. 1 to 5 comprises a mold 24, which corresponds to the curved trend of the plastic profile 20 to be produced. A longitudinal center axis of the mold 24 is accordingly curved precisely the same as the plastic profile 20 to be produced, so that the radius of the plastic profile 20 and the longitudinal center axis of the mold 24 are identical.

The reinforcement 21 or the strands 23 are associated with an uncoiling device, not shown, which is before the device looking in the production direction 25, and which holds a supply of the reinforcement 21. The uncoiling device comprises several spools on which the strands are wound up. The spools may be driveable and/or brakable, so that the strands 23 are constantly pretensioned.

Figure 1:
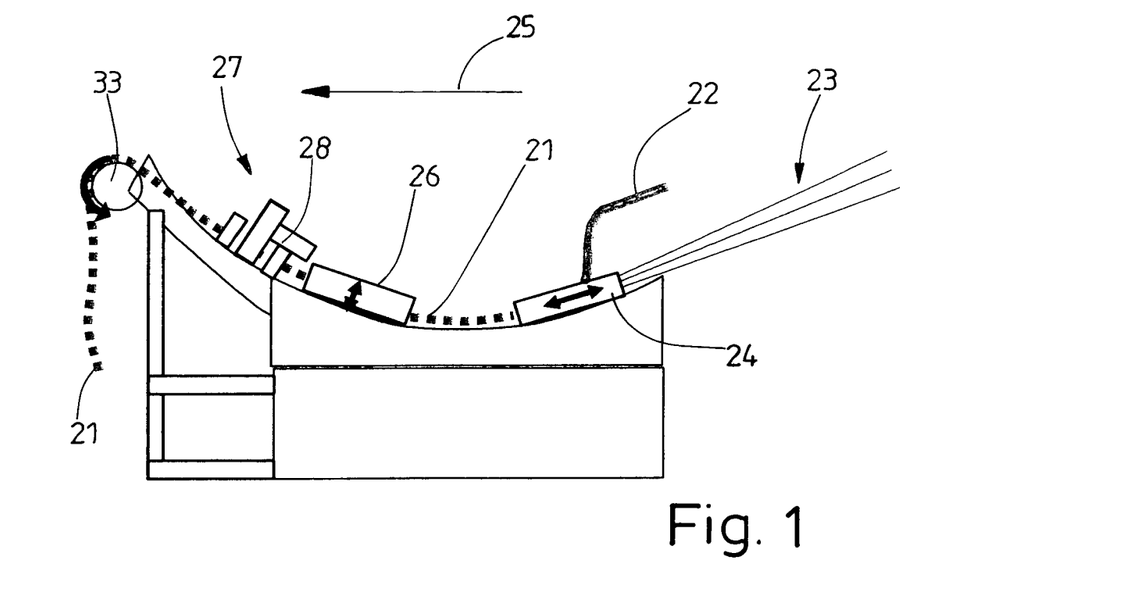
FIG. 1 is a schematic view of a device according to the invention in a starting position.

As in the known radius pultrusion methods, the mold 24 for producing the plastic profile is moved back and forth thereon in or against the production direction 25. During the movement of the mold 24 against the production direction 25, the individual strands 23 of the reinforcement 21 are drawn into the mold and embedded there with the matrix or the plastic 22, which is conducted into the mold 24 via a feed line (FIG. 1). During this backward movement of the mold 24, the already finished plastic profile 20 is held firmly by at least one holding means 26 before the mold 24, looking in the production direction 25. Once the mold 24 has been moved all the way back on the plastic profile 20, the holding means 26 loses contact with the plastic profile 20 and the mold 24 together with the already finished plastic profile 20 are moved forward in the production direction 25, while the finished plastic profile 20 is moved through the opened holding means 26. Once the mold 24 comes close to the holding means 26 or makes contact with the holding means 26, the plastic profile 20 is again grasped by the holding means 26 and the mold 24 once again moves against the production direction 25 along the strands 23 of the reinforcement 21.

Looking in the production direction 25, a further holding means device 27, which may also be known as or serve as a stripping device, may be situated before the holding means 26, which grabs the plastic profile 20 in order to transport it away. Furthermore, the holding means device 27 or the stripping device is associated with a saw 28, by which both the finished plastic profile 20 can be cut into segments and the reinforcement 21 trimmed off.

In order to produce a straight plastic profile 20, it may also be provided to hold the mold 24 still and to move the holding means 26, 27 periodically in alternation on the plastic profile 20 in and against the production direction 25 and to pull the reinforcement 21 or the plastic profile 20 through the mold 24.

Figure 6:
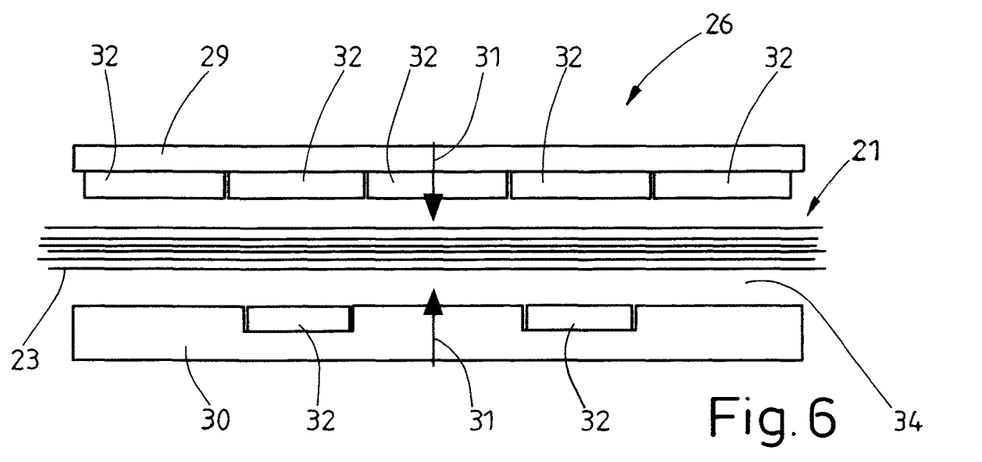
FIG. 6 is a schematic representation of a holding means in a starting position.
Figure 9:
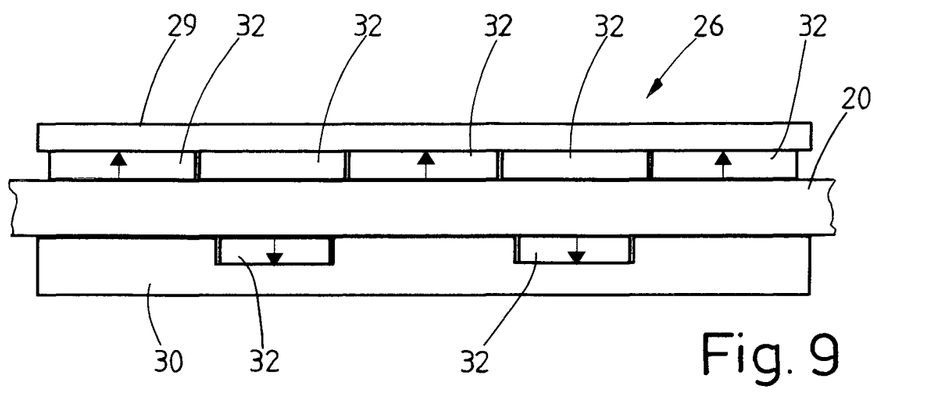
FIG. 9 shows the holding means of FIG. 6 in a fourth position.

For the grasping of the plastic profile 20 by the holding means 26, the latter is composed of multiple movable holding means parts 29, 30. FIG. 6 shows highly schematized a holding means 26 having two holding means parts 29, 30. For the grasping of the plastic profile 20, these two holding means parts 29, 30 are moved together in the arrow direction 31, i.e., perpendicular to the production direction 25 and to the longitudinal axis of the plastic profile (FIG. 6, FIG. 9). The space enclosed by the two holding means parts 29, 30 is called the receiving space 34 and serves to receive the plastic profile 20 and the reinforcement 21. The inner walls of the receiving space 34 are pressed against the plastic profile 20 and the reinforcement 21 in order to create enough friction to transport them away. It is also conceivable for the holding means 26 to comprise multiple holding means parts 29, 30 which can be arranged around the plastic profile 20.

Each holding means part 29, 30 comprises multiple holding means jaws 32, which extend into the receiving space 34. These holding means jaws 32 are configured such that they can be moved back and forth in the arrow direction 31, i.e., transversely to the production direction 25, so that the cross section of the receiving space 34 changes along the longitudinal axis of the holding means 26. Depending on whether the holding means jaws 32 are moved equally or differently, the receiving space 34 will have one cross section or many different cross sections.

The holding means jaws 32 may be designed as blocks, which can travel by an actuator in the arrow direction 31. Likewise, it is conceivable for the holding means jaws 32 to be bags or cushions which can be filled with a gas or a liquid under pressure, in order to change their volume in the arrow direction 31.

Figure 7:
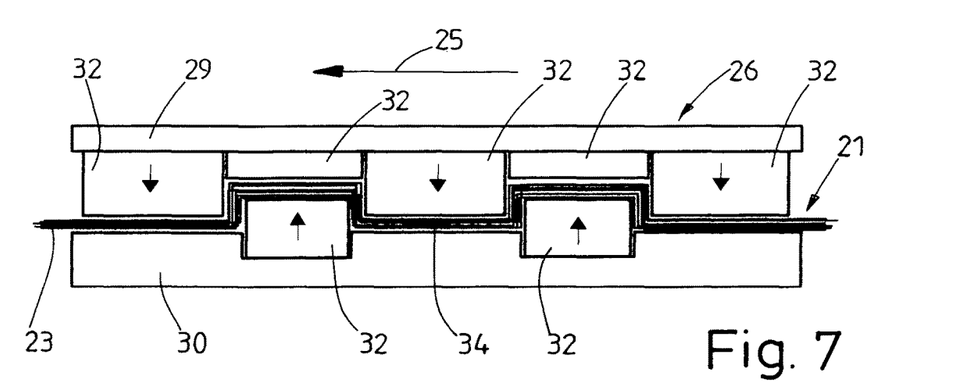
FIG. 7 shows the holding means of FIG. 6 in a second position.

At the start of the manufacturing process, first of all the reinforcement 21, i.e., the individual strands 23, must be led through the mold 24 and through the at least one holding means 26 and fastened to the stripping device 33. In order to pull the reinforcement 21 through the mold 24, a sufficiently large tensile force must be applied. Especially when the reinforcement 21 is at least partly sheathed with the plastic 22, the necessary tensile force may be very large. The stripping device 33 cannot produce this tensile force. Therefore, according to the invention, especially for the start process of the method, the reinforcement 21 is pulled through the mold 24 by the at least one holding means 26. In order for the holding means 26 to apply a large enough tensile force to the reinforcement 21 or to the individual strands 23, the holding means parts 29, 30 for the grasping of the reinforcement 21 are moved together in the arrow direction 31 and in addition the holding means jaws 32 are moved toward each other in the arrow direction 31, so that different cross sections are formed for the receiving space 34 and the individual strands 23 of the reinforcement 21 are forced by the individual holding means jaws 32 into a meandering path (FIG. 7). As a result of this grasping or clamping of the individual strands 23, a sufficiently large frictional locking or force locking can be achieved between the holding means 26 and the reinforcement 21 to draw the reinforcement 21 through the mold 24.

As described above with the aid of FIG. 1, at the start of the production process the reinforcement 21 is at first pulled through the mold 24 and the holding means 26. For this, the reinforcement 21 is grasped by the holding means 26 or by the holding means jaws 32 and the mold 24 is moved against the production direction 25 along the reinforcement 21. As soon as the outer deflection of the mold 24 has been achieved, the holding means jaws 32 move back against the arrow direction 31 and release the individual strands 23 of the reinforcement 21. The mold 24 is then moved back in the production direction 25. In order for the reinforcement 21 or the strands 23 to remain taut during this forward movement of the mold 24, they are additionally pulled away by the stripping device 33, so that they remain stretched between the stripping device 33 and the mold 24 (FIG. 1). Once the mold 24 has reached its starting position, the reinforcement 21 is again grasped by the holding means 26 or the holding means jaws 32.

Since as a result of this grasping of the reinforcement 21 by the holding means jaws 32 the length of the reinforcement 21 clamped between the holding means jaws 32 is increased, the stripping device 33 again releases a certain portion of the reinforcement 21 so that it does not rip. The grasping of the reinforcement 21 by the holding means jaws 32 occurs sequentially, i.e., the individual holding means jaws 32 are moved in succession and preferably in the production direction 25 in the direction of the reinforcement 21, so that no jamming of the individual strands 23 in the holding means 26 occurs.

Figure 2:
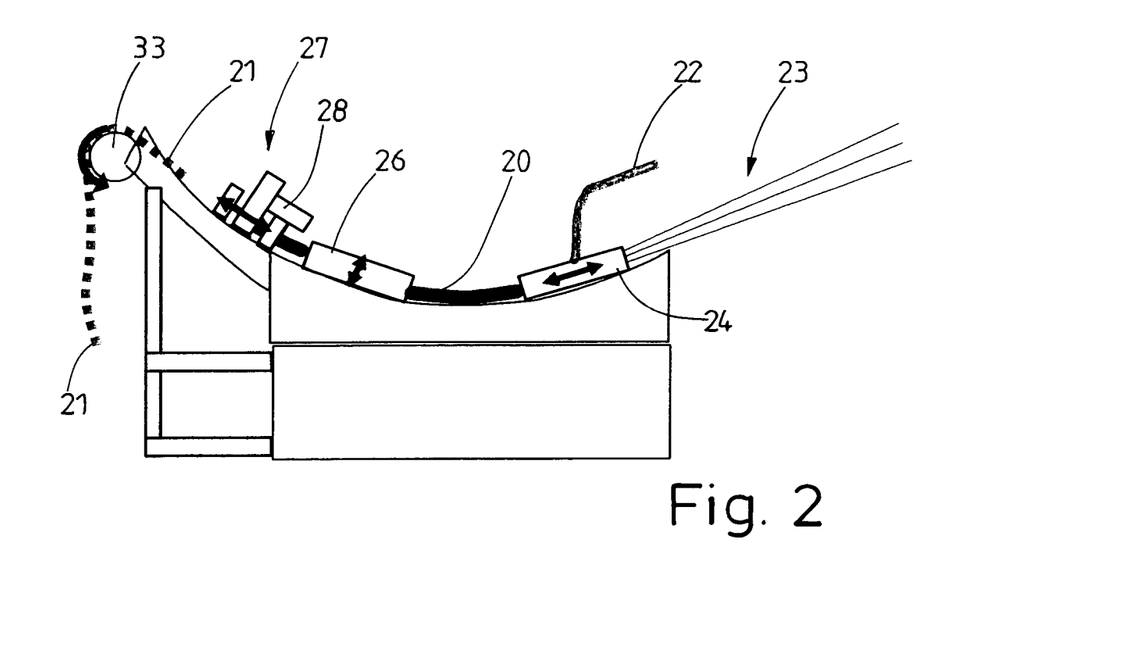
FIG. 2 is a schematic view of the device in a second phase of the method according to the invention.
Figure 8:
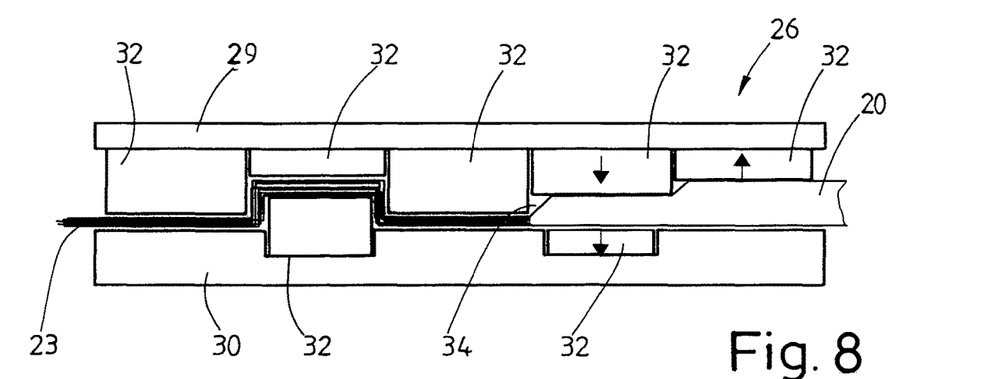
FIG. 8 shows the holding means of FIG. 6 in a third position.

Once an at least partly formed plastic profile 20 has been produced in the mold 24 and has reached the holding means 26 by the process described above, the cross sections of the receiving space 34 are changed accordingly by moving together the holding means jaws 32 enough so that they can firmly grasp the at least partly formed plastic profile 20 (FIG. 2, FIG. 8). The moving together of the holding means jaws 32 occurs automatically. The holding means jaws 32 move toward the reinforcement 21 or the plastic profile 20 until a certain mechanical resistance or counterpressure is reached.

In the following production cycles, the plastic profile 20 is then fully formed and pulled by the holding means 26 through the mold 24 in known manner (FIG. 2). In this phase, all holding means jaws 32 are fully retracted, so that the receiving space 34 achieves its largest cross section (FIG. 9). The holding means parts 29, 30 now grasp the plastic profile 20 in known manner. In this phase, the plastic profile 20 is produced in a certain quantity in known manner. The front part of the plastic profile 20 that was formed during the start phase is deflected by the saw 28. The reinforcement 21 that was led at first through the mold 24 and the holding means 26 is taken away by the stripping device 33 (FIG. 2).

Figure 3:
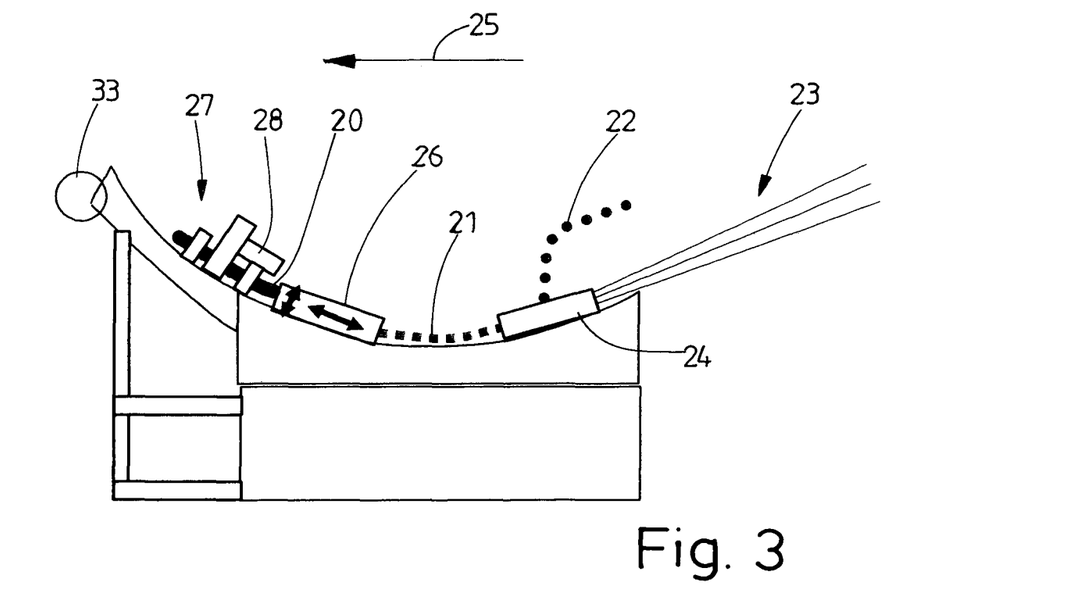
FIG. 3 is a schematic view of the device of FIG. 1 in a third phase.
Figure 4:
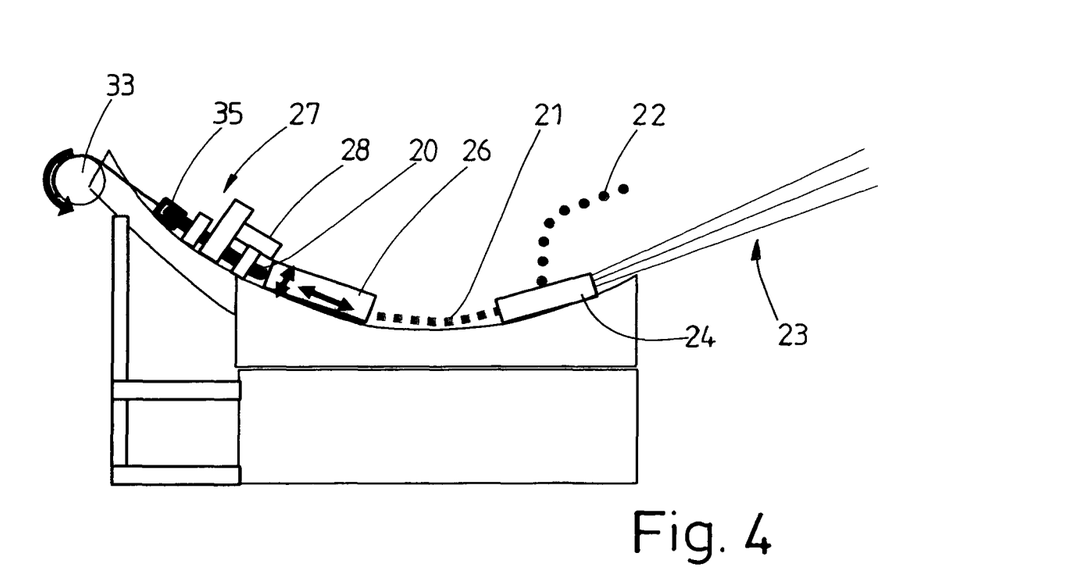
FIG. 4 is a schematic view of the device of FIG. 1 in a fourth phase.
Figure 10:
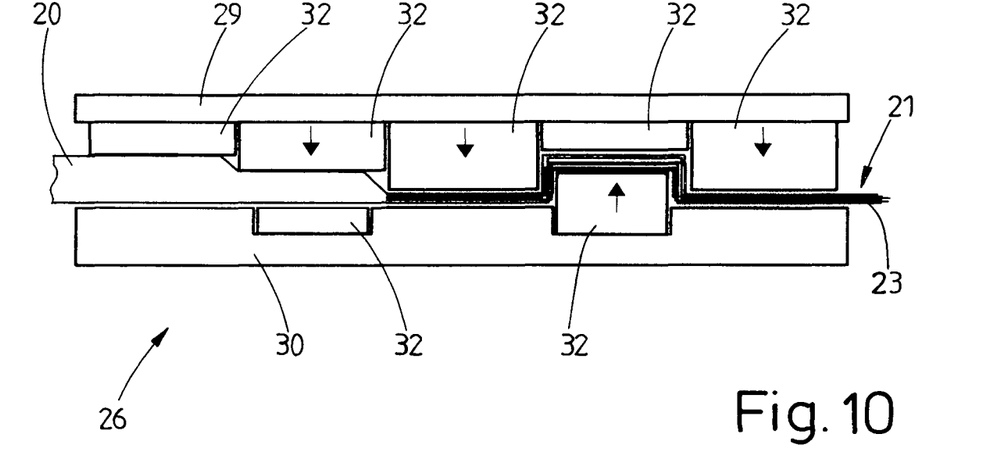
FIG. 10 shows the holding means of FIG. 6 in a fifth position.

If the production of the plastic profile 20 needs to be halted, first of all the feeding of the plastic 20 to the mold 24 is interrupted. In this way, the plastic profile 20 is formed only partly in the mold 24 and the loose strands 23 of the reinforcement 21 will again be pulled into the holding means 26, besides the plastic profile 20 (FIG. 10). Because the plastic profile 20 no longer fully fills up the receiving space 34 of the holding means 26, the holding means jaws 32 again move further into the receiving space 34, so that a force locking connection with the reinforcement 21 and the individual strands 23 is again formed. The remaining plastic profile 20 is now transported away by the interplay of the holding means 26 and the holding means device 27 or the stripping device 33 in the production direction 25 (FIG. 3). For this, the plastic profile 20 is sawn off at a place so that the loose end of the plastic profile 20 can be pulled off by an additional gripper 35, connected to the stripping device 33, in the production direction 25 (FIG. 4).

Figure 5:
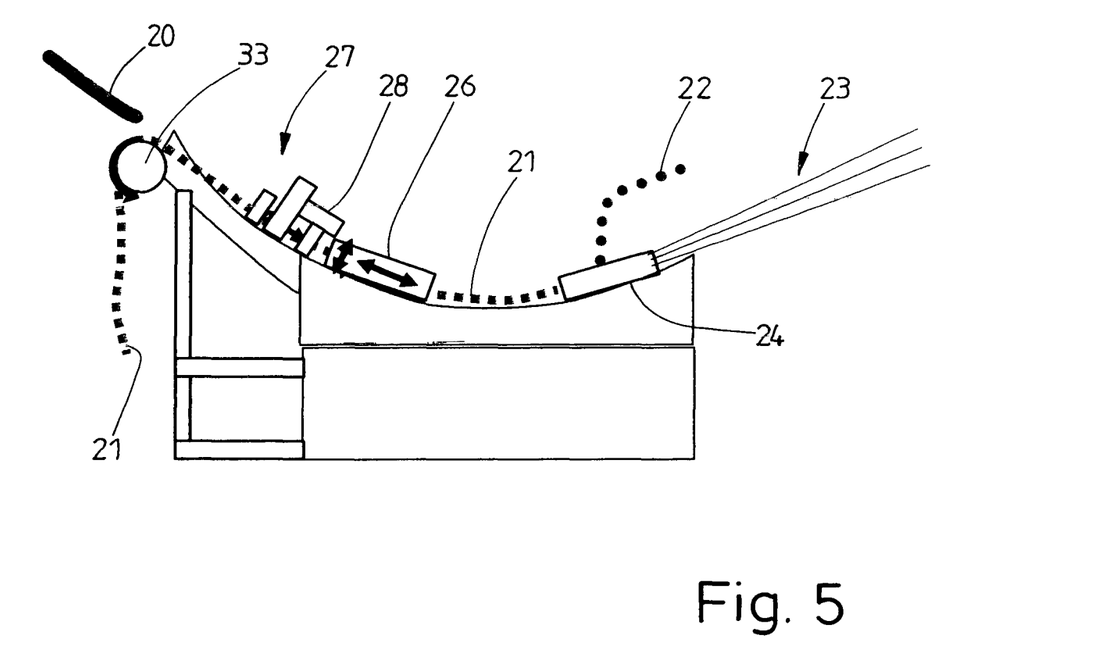
FIG. 5 is a schematic view of the device of FIG. 1 in a fifth phase.

As soon as the only partly formed plastic profile 20 has been taken away by the stripping device 33, a severing of the remainder of the plastic profile 20 from the strands 23 of the reinforcement 21 by the saw 28 once again occurs. The loose strands 23 of the reinforcement 21 are then again placed under tension by the stripping device 33 and the device is ready to produce a further plastic profile 20 by the pultrusion process (FIG. 5).

Figure 11:
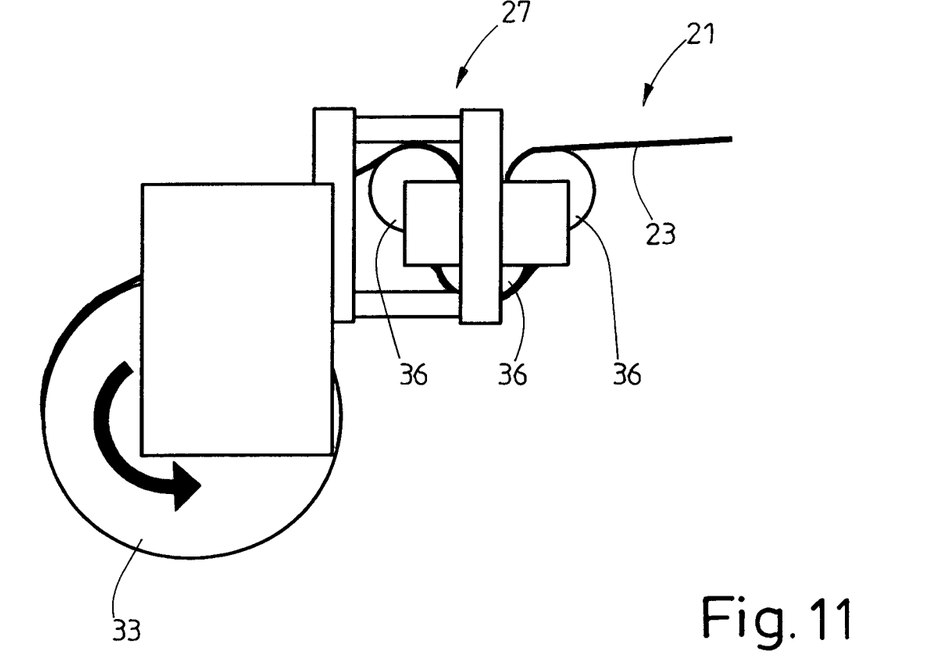
FIG. 11 is a schematic representation of a side view of a stripping device.
Figure 12:
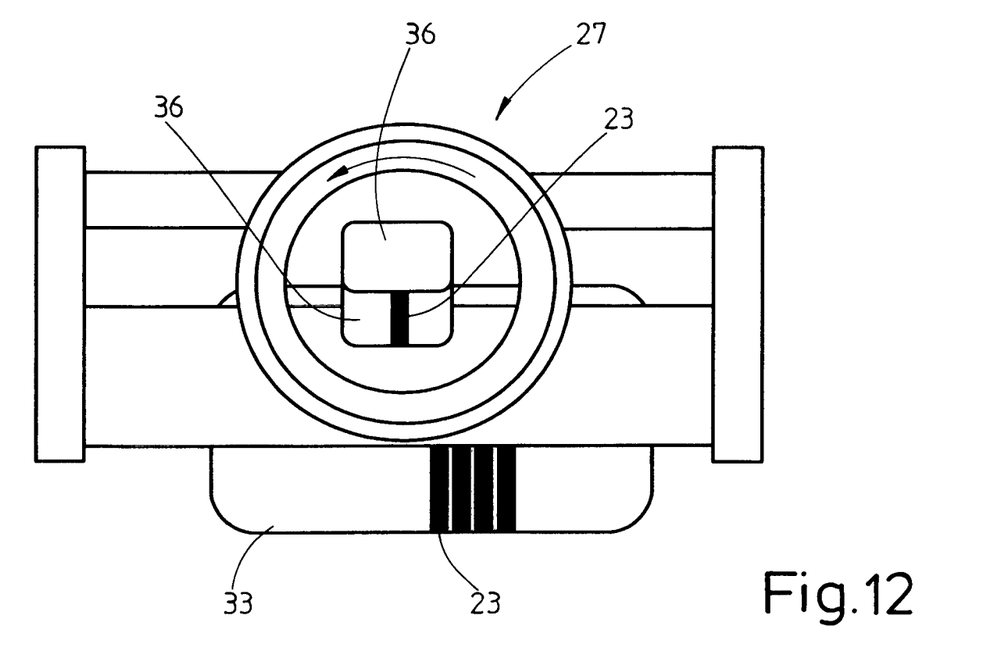
FIG. 12 is a schematic view of the stripping device of FIG. 11 looking in the production direction.

In order to protect the individual strands 23 of the reinforcement 21 additionally against slippage during the start phase, i.e., during the pulling of the reinforcement 21 through the mold 24 or the holding means 26, the individual strands 23 may be additionally twisted. For this, according to the invention it is provided for example that the holding means device 27 or a stripping device is rotatably mounted. The exemplary embodiment of the holding means device 27 and the stripping device 33 represented in FIGS. 11 and 12 only represents their function and is only applicable to FIGS. 1 to 5 in this regard. The reinforcement 21 or the individual strands 23 are led through the holding means device 27 and then taken up by the stripping device 33, which pulls the strands 23 through the holding means device 27. The holding means device 27 represented here has three rollers 36, through which the strands 23 are led. The holding means device 27 may be designed as a calander. For the twisting of the individual strands 23, now, the holding means device 27 is rotated together with the rollers 36 (FIG. 2). The reinforcement 21 subsequently pulled away by the stripping device 33 then has twisted strands 23.

LIST OF REFERENCE NUMBERS

20 Plastic profile
21 Reinforcement
22 Plastic
23 Strand
24 Mold
25 Production direction
26 Holding means
27 Holding means device
28 Saw
29 Holding means part
30 Holding means part
31 Arrow direction
32 Holding means jaw
33 Stripping device
34 Receiving space
35 Gripper
36 Roller

The invention claimed is:
1. A method for producing a curved plastic profile, the method comprising:
   providing continuous reinforcement made of strands and/or textiles,
   forming a first section and a plurality of additional sections of the curved plastic profile in a mold, each section of the curved plastic profile comprising the continuous reinforcement embedded in a matrix, wherein the first section of the curved plastic profile is directly adjacent to a dry section of the continuous reinforcement which is not embedded in the matrix, wherein forming each section of the curved plastic profile comprises:
      changing cross sections of a receiving space in at least one holding means along a longitudinal axis of the at least one holding means such that the at least one holding means can grasp the dry section of the continuous reinforcement and/or a grasped section selected from the first section and the plurality of additional sections of the curved plastic profile, grasping with the at least one holding means, at least temporarily, the dry section of the continuous reinforcement and/or the grasped section of the curved plastic profile, and pulling the continuous reinforcement through the mold with the at least one holding means and, in the mold, embedding the continuous reinforcement in the matrix;

periodically moving the mold and the at least one holding means relative to each other;

wherein forming one additional section of the plurality of additional sections of the curved plastic profile comprises:

changing the cross sections of the receiving space in the at least one holding means along the longitudinal axis of the at least one holding means such that the at least one holding means can grasp the dry section of the continuous reinforcement and the first section of the curved plastic profile, simultaneously firmly grasping with the at least one holding means both the dry section of the continuous reinforcement and the first section of the curved plastic profile, and pulling the continuous reinforcement through the mold with the at least one holding means and, in the mold, embedding the continuous reinforcement in the matrix.

2. The method as claimed in claim 1, wherein forming one of the sections of the curved plastic profile further comprises:

changing the cross sections of the receiving space in the at least one holding means at positions along the longitudinal axis of the at least one holding means such that the corresponding grasping step grasps the continuous reinforcement and deflects the continuous reinforcement from a straight configuration to a meandering configuration.

3. The method as claimed in claim 1, wherein one instance of changing the cross sections of the receiving space in the at least one holding means along the longitudinal axis of the at least one holding means further comprises:

changing the cross sections of the receiving space in succession.

4. The method as claimed in claim 3, wherein in the one instance the cross sections of the receiving space are changed sequentially in succession along the longitudinal axis of the at least one holding means.

5. The method as claimed in claim 1, wherein a holding means part of the at least one holding means comprises holding jaws which move perpendicular to a longitudinal axis of the continuous reinforcement or a grasped section of the curved plastic profile.

6. The method as claimed in claim 5, wherein the holding jaws of the holding means part of the at least one holding means move independently perpendicular to the longitudinal axis of the continuous reinforcement or a grasped section of the curved plastic profile.

7. The method as claimed in claim 1, further comprising:

clamping the continuous reinforcement with a stripping device situated upstream from the at least one holding means in a production direction such that the at least one holding means is positioned between the stripping device and the mold in the production direction, and at least partly releasing the continuous reinforcement from the stripping device when the at least one holding means is grasping the continuous reinforcement or a section of the curved plastic profile.

8. The method as claimed in claim 7, further comprising:

releasing the at least one holding means such that it does not grasp the continuous reinforcement or any section of the curved plastic profile, and moving the at least one holding means along the continuous reinforcement, wherein the continuous reinforcement is clamped by the stripping device during moving of the at least one holding means.

9. The method as claimed in claim 7, further comprising:

twisting the continuous reinforcement by rotating the stripping device about the longitudinal axis of the at least one holding means.

10. The method as claimed in claim 7, wherein the stripping device is a stripping roller, a stripping winch or another holding means.

11. The method as claimed in claim 7, wherein at least partly releasing the continuous reinforcement from the stripping device comprises decreasing a clamping force of the stripping device.

12. The method as claimed in claim 1, further comprising:

moving the mold along a backward direction against a production direction to produce a section of the curved plastic profile, wherein moving the mold is performed while the at least one holding means is grasping the continuous reinforcement or a section of the curved plastic profile, moving the at least one holding means in the backward direction, wherein moving the at least one holding means is performed while the mold is stationary.

13. The method as claimed in claim 12, wherein moving the at least one holding means in the backward direction comprises moving the at least one holding means into a vicinity of a front end of the mold after the backward moving of the mold.

* * * * *